United States Patent [19]

Rodgers et al.

[11] Patent Number: 5,853,443
[45] Date of Patent: Dec. 29, 1998

[54] MOISTURE SEPARATOR FOR FLUID COMPRESSOR

[75] Inventors: Robert C. Rodgers; Lance S. Hathcock, both of Mooresville, N.C.

[73] Assignee: Ingersoll-Rand Company, Woodcliff Lake, N.J.

[21] Appl. No.: 908,603

[22] Filed: Aug. 8, 1997

[51] Int. Cl.[6] .......................... B01D 45/08; B01D 45/16
[52] U.S. Cl. ...................... 55/456; 55/457; 55/DIG. 17
[58] Field of Search .................. 95/269; 55/447, 55/456, 458, DIG. 17, 457

[56] References Cited

U.S. PATENT DOCUMENTS

| | | | |
|---|---|---|---|
| 1,525,249 | 2/1925 | Mastenbrook | 55/456 |
| 2,186,344 | 1/1940 | Price | 55/456 |
| 3,086,343 | 4/1963 | Stern | 55/456 |
| 3,461,652 | 8/1969 | Sato | 55/457 |
| 3,538,684 | 11/1970 | Esterhoy, Jr. et al. | 55/457 |
| 3,778,980 | 12/1973 | Vancini | 55/456 |
| 3,841,484 | 10/1974 | Domnick | 210/95 |
| 3,885,934 | 5/1975 | Eads et al. | 55/457 |
| 3,885,935 | 5/1975 | Nutter | 55/457 |
| 4,105,561 | 8/1978 | Domnick | 210/232 |
| 4,221,577 | 9/1980 | Lowrie | 55/457 |
| 4,629,481 | 12/1986 | Echols | 55/457 |
| 4,668,256 | 5/1987 | Billiet et al. | 55/219 |
| 4,701,258 | 10/1987 | Billiet et al. | 210/232 |
| 4,786,298 | 11/1988 | Billiet et al. | 55/269 |
| 5,196,117 | 3/1993 | Billiett et al. | 210/265 |
| 5,225,073 | 7/1993 | Billiet et al. | 210/121 |

OTHER PUBLICATIONS domnick hunter brochure, Type WS Water Separators, installation, operation and maintenance instructions, ©domnick hunter limited 1992, Stock No. 17 118 0700.
domnick hunter brochure, Oil–X type WS, High Efficiency Compressed Air Water Separators, ©domnick hunter limited 1996 Publication reference: 13 Nov. 1996 Ref. 000, Stock No. 17 400 4413.
Bulletin 809M, Wright–Austin, Centrifugal Type, In–Line Separators with "BLC"™, no date.

*Primary Examiner*—Duane S. Smith
*Attorney, Agent, or Firm*—Michael M. Gnibus

[57] ABSTRACT

A moisture separator including a separator tank that defines a separation chamber, the separator tank having an inlet; and a separation element located at the separator tank inlet, the separation element including an outer ring having a first side and a second side, the outer ring defining a flow opening; a hub located in the flow opening; and a plurality of flow directing elements, each flow directing element including a rib joining the outer ring and the hub, and a first guide vane made integral with the rib and located along the first side of the outer ring, and a second guide vane made integral with the rib and located along the second side of the outer ring.

12 Claims, 6 Drawing Sheets

MOISTURE SEPARATOR FOR FLUID COMPRESSOR

BACKGROUND OF THE INVENTION

The invention generally relates to moisture separators for fluid compressors and more particularly, the invention relates to moisture separators for fluid compressors where the moisture separator includes a separator element that creates a vortex within the separation chamber to achieve primary separation of the moisture and compressed gas, and also includes means for achieving secondary separation of the moisture and compressed gas.

During operation of conventional fluid compressors, a liquid such as water or oil, is entrained with the gas as the gas flows through the compressor and is compressed. Since it is undesirable to deliver a mixture of compressed gas and a liquid to a pneumatically actuated tool or other object of interest, fluid compressors typically include means for separating the entrained liquid from the compressed gas so that the supplied compressed gas is substantially liquid-free.

Typically in conventional moisture separators, the mixture comprised of compressed gas and liquid is flowed into the separation chamber of a cylindrical tank, in a direction tangent to the cylindrical tank sidewall. As a result, the mixture is directed along a circular, helical path and a vortex is generated. The resultant centrifugal forces acting on the swirling mixture cause the heavier, condensed liquid to be separated from the compressed gas and forced outward, toward the periphery of the vortex and against the tank wall. The separated liquid is collected in a sump at the bottom of the separator tank. A significant volume of liquid typically remains entrained in the compressed gas.

Conventional moisture separators that flow the compressed gas/liquid mixture directly into the separation chamber in a direction tangent to the tank sidewall and rely on centrifugal forces to separate the entrained liquid from the compressed gas do not effectively separate substantially all of the liquid from the compressed gas. Accordingly, the compressed gas supplied to a pneumatically actuated object of interest such as a tool, may contain a significant volume of undesirable liquid which can damage the tool or other object of interest.

The foregoing illustrates limitations known to exist in present moisture separators for fluid compressors. Thus, it is apparent that it would be advantageous to provide a moisture separator that overcomes the limitations. Accordingly, a suitable alternative moisture separator is provided including features more fully disclosed hereinafter.

SUMMARY OF THE INVENTION

The present invention is a moisture separator comprising: a separator tank that defines a separation chamber, the separator tank having an inlet; and a separation element located at the separator tank inlet, the separation element comprising an outer ring having a first side and a second side, the outer ring defining a flow opening; a hub located in the flow opening; and a plurality of flow directing elements, each flow directing element comprising a rib joining the outer ring and the hub, a first guide vane made integral with the rib and located along the first side of the outer ring, and a second guide vane made integral with the rib and located along the second side of the outer ring.

DESCRIPTION OF THE DRAWING FIGURES

DESCRIPTION OF THE PREFERRED EMBODIMENT

Figure 1:
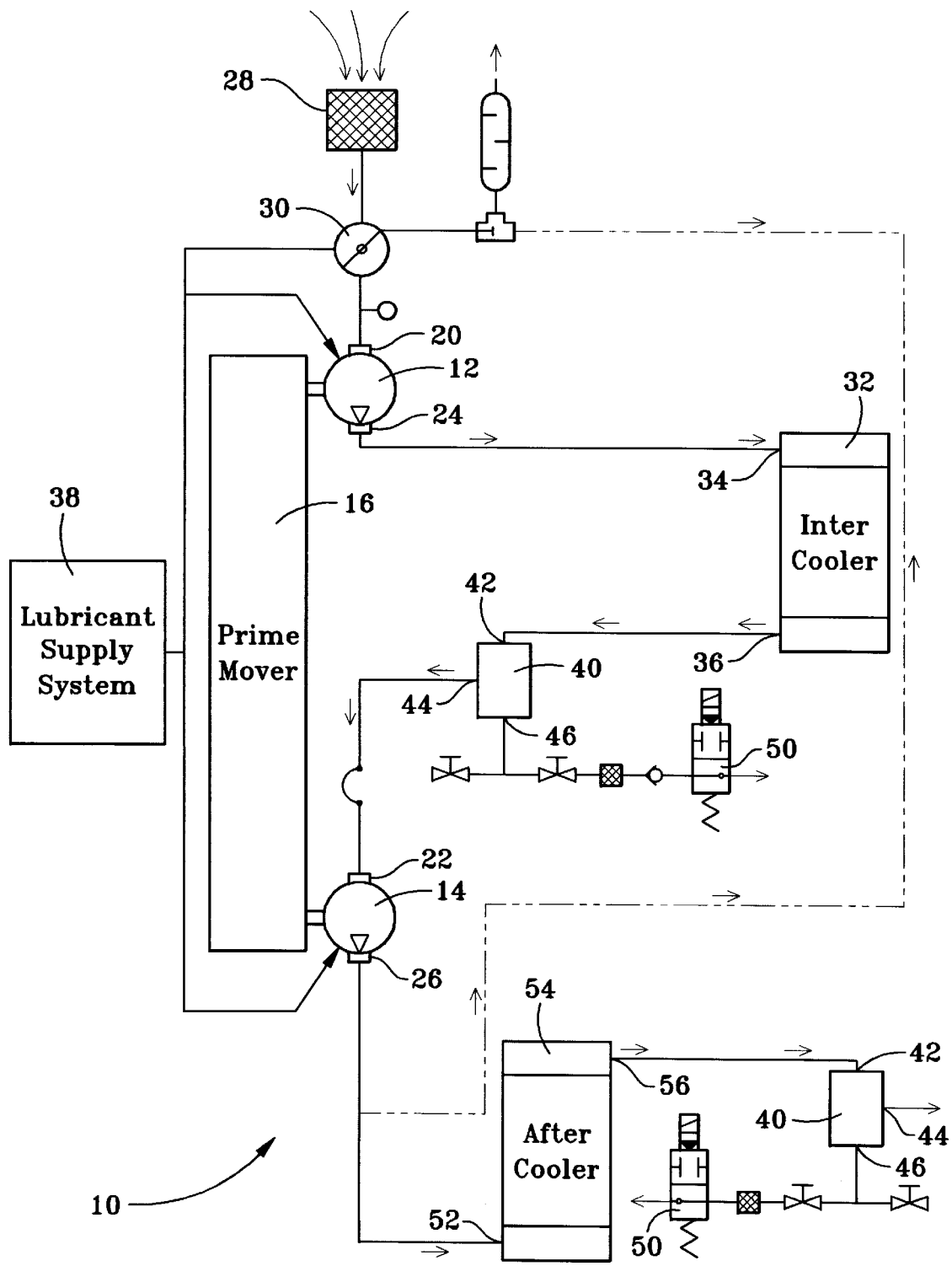
FIG. 1 is a schematic representation of a fluid compressor that includes the moisture separator of the present invention.

Now turning to the drawing Figures wherein like parts are referred to by the same number in all the drawing Figures, FIG. 1 schematically illustrates a fluid compressor 10 that includes moisture separator 40 of the present invention. The moisture separator 40 shall be described in further detail hereinbelow.

Fluid compressor 10 is a two stage compressor that includes first and second stage compression modules 12 and 14 that are driven directly by respective prime mover 16 through a conventional gearbox (not shown). The compression modules may be rotary screw compression modules for example, well known to one skilled in the art with interengaging male and female rotors. Although compressor 10 is described herein as a two stage compressor, with two identical moisture separators 40, it should be understood that compressor 10 may be any single stage gas compressor that includes a single moisture separator 40.

Compression modules 12 and 14 include respective inlet ports 20 and 22 and discharge ports 24 and 26.

During operation of compressor 10, gas flows into the compressor 10 through filter 28 and inlet control valve 30 which is flow connected to the inlet 20 of the first compression module 12. The gas is compressed by first stage compression module 12, and a mixture comprised of liquid and compressed gas is discharged out port 24 to a conventional intercooler 32 that is flow connected to discharge port 24. The mixture of compressed gas and liquid enters the intercooler through intercooler inlet 34.

Lubricant is supplied to the bearings and other mechanical components of the inlet control valve 30 and compression modules 12 and 14, as required, by a lubricant supply system 38. The intercooler and lubricant supply system are of conventional design well known to one skilled in the art.

The cooled liquid/compressed gas mixture is flowed out of the intercooler discharge port 36 to a first moisture separator 40 that is flow connected to the intercooler discharge port. The liquid and compressed gas mixture is flowed into the moisture separator 40 through moisture separator inlet 42. Substantially liquid-free compressed gas is discharged from the separator 40 through separator discharge port 44.

A fluid sump drain port 46 allows liquid separated from the compressed gas and collected in the separator to be drained from the separator tank sump. During operation of compressor 10, solenoid valve 50 is opened as required to drain the collected liquid from the separator sump. The drained liquid is flowed through valve 50 and may be collected in a receptacle such as a drum. After the sump has been emptied the solenoid valve is closed.

The substantially liquid-free compressed gas flows from the discharge port 44 to the inlet 22 of second stage compression module 14. The compressed gas then flows from discharge port 26 through the inlet 52 of aftercooler 54, out aftercooler discharge port 56 and through second stage moisture separator 40 which is identical to the first stage moisture separator.

The substantially liquid-free compressed gas is discharged from separator discharge port 44 to an object of interest, such as a pneumatic tool for example. Solenoid valve 50 associated with second stage moisture separator 40 is opened as required to drain collected liquid from the separator sump as previously described in the description of the first compression stage of compressor 10.

The moisture separator 40 of the present invention will now be described. The moisture separator 40 represented schematically in FIG. 1, is shown in greater detail in FIGS. 2–6. The moisture separator 40 is located downstream from compression modules 12 and 14 in compressor 10, to separate condensed moisture such as water or oil, after each from the compressed gas to deliver substantially moisture-free compressed gas to an object of interest.

Figure 3:
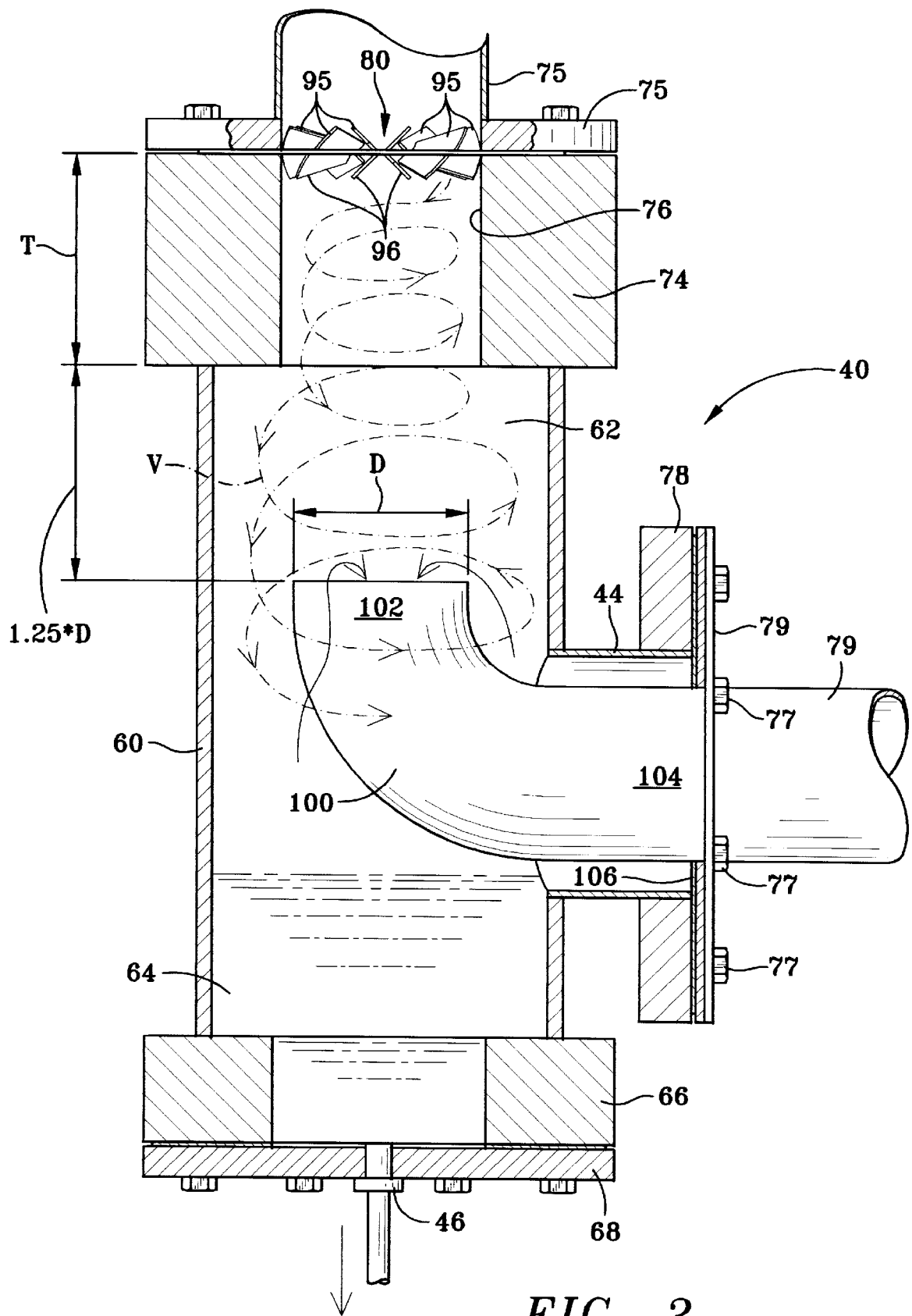
FIG. 3 is a longitudinal sectional view of the moisture separator of FIG. 2.

Turning to FIG. 3, the moisture separator 40 includes a cylindrical separator tank 60 that defines a separation chamber 62. A sump 64 is located at the discharge end of the separation chamber and is defined by the separation tank sidewall, sump flange 66 made integral with the tank at the tank discharge end, and sump drain cover 68 that is connected to the sump flange. Separated liquid is collected in the sump and is periodically drained out of the sump through drain 46 by opening solenoid valve 50 in the manner previously described hereinabove.

Figure 2:
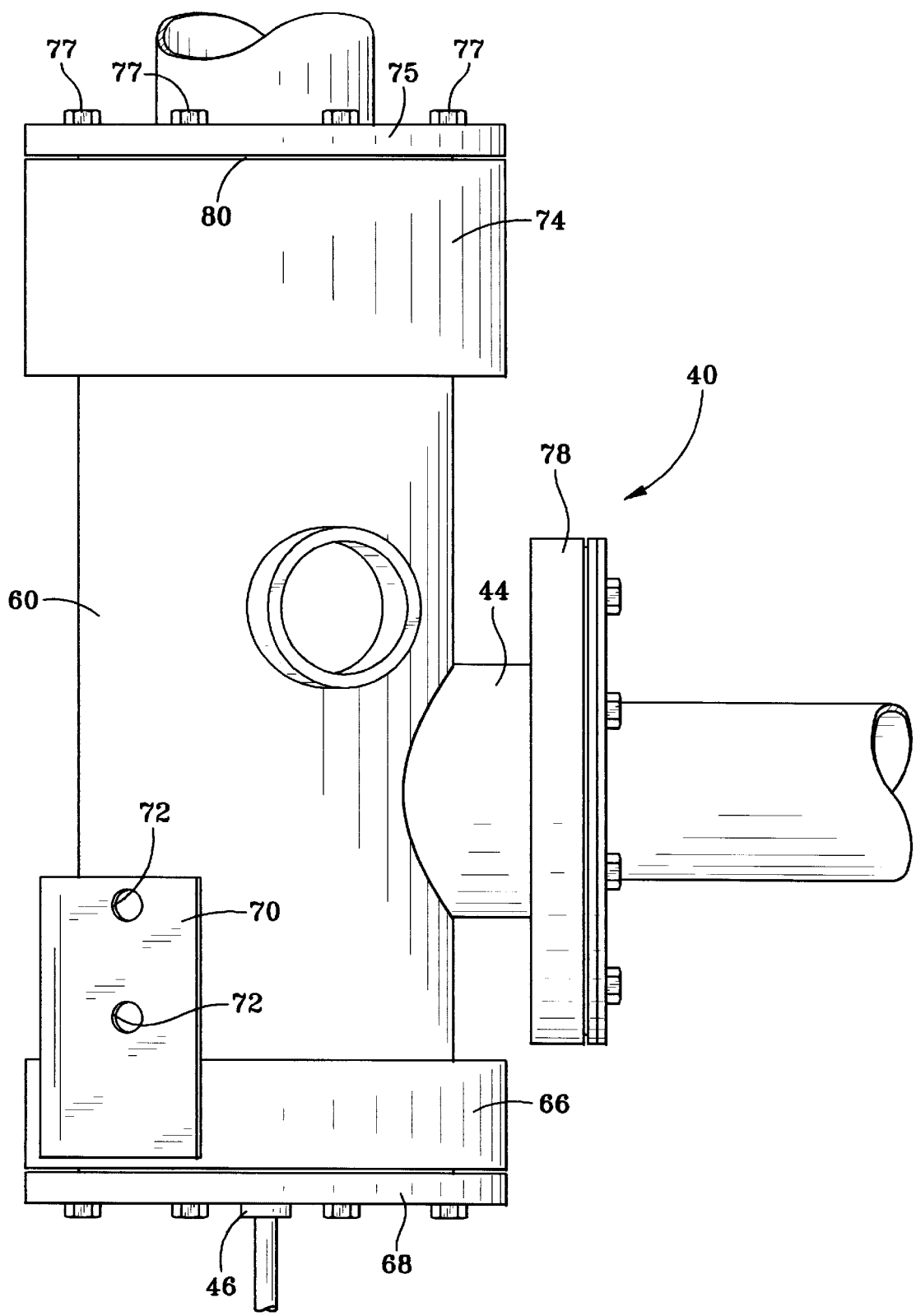
FIG. 2 is an elevational view of the assembled moisture separator.

As shown in FIG. 2, an anchor bracket 70 is made integral with the sump flange 68 and includes apertures 72 that are adapted to receive conventional fasteners to couple the separator to the compressor frame or other stationary member to prevent displacement of the separator 40 during compressor operation.

An inlet flange 74 having a thickness identified as "T" in FIG. 3, is made integral with the inlet end of separator tank 60 and defines separator tank inlet 76. The inlet flange 74, sump flange 66, and anchor bracket 70 are made integral with tank 60 by a conventional weld connection.

Separator tank discharge port 44 includes a discharge port flange 78 made integral with the discharge port.

Separator element 80 is sandwiched between inlet flange 74 and inlet piping flange 75. The inlet piping flange is flow connected to the flange 74 by conventional fasteners 77. See FIG. 2.

Separator element 80 includes an outer ring 82 that defines an inlet opening 84. The inlet flow opening overlays the inlet 76 when the separator element is seated on the inlet flange 74. The outer ring is substantially planar and includes an upstream side 86 and a downstream side 88. A hub 90 is located in the inlet opening and is coplanar with the outer ring.

Figure 4:
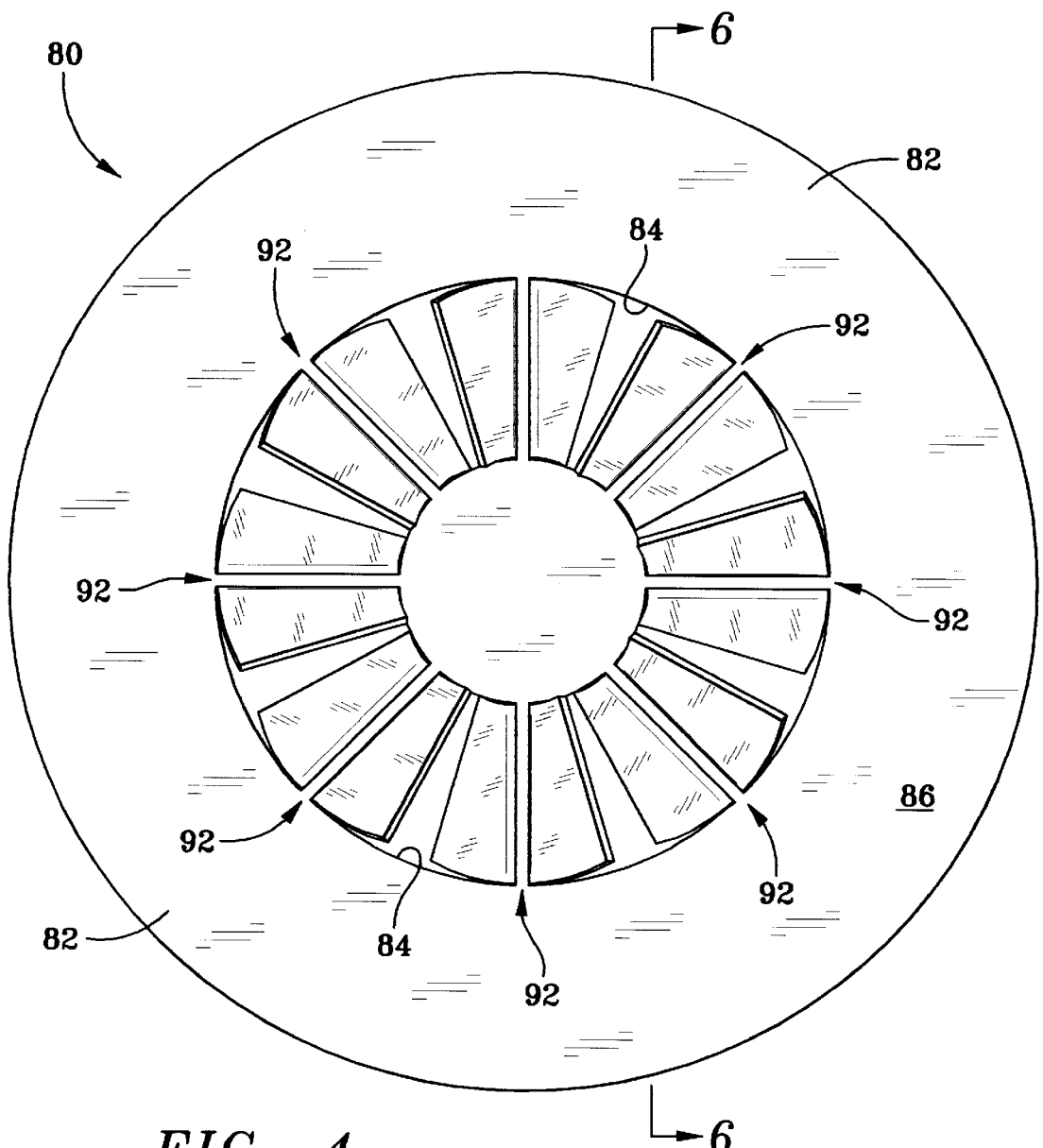
FIG. 4 is a top plan view of the separator element of the moisture separator of FIG. 3.

A plurality of flow directing elements 92 are located in the flow opening 84 between the outer ring 82 and the hub 90. See FIG. 5. As shown in FIG. 4, the preferred embodiment of the invention includes eight flow directing elements however it should be understood that any suitable number of flow directing elements may be included in the inlet flow opening 84. The separation elements serve to direct the mixture through inlets 84 and 76 and produce a vortex that begins in the inlet 76 and continues into chamber 62.

Moisture separator performance tests conducted by the inventors in Davidson, North Carolina, have indicated that the moisture separator 40 operates most effectively to remove moisture from the moisture/compressed gas mixture when the thickness T, of the inlet flange 74 is equal to the diameter of the opening 84 in the outer ring 82. However it should be understood that the moisture separator still operates effectively if the inlet flange thickness and outer ring diameter are not equal.

Each separator element includes a radially extending rib 94 that joins the hub and outer ring, a first guide vane 95 that is made integral with the rib and terminates at a free edge located along the upstream side 86 of the outer ring 82, and a second guide vane 96 that is made integral with rib 94 and terminates at a free edge located along the downstream side 88 of the outer ring 82. Each guide vane has four edges and the guide vanes are planar.

Figure 6:
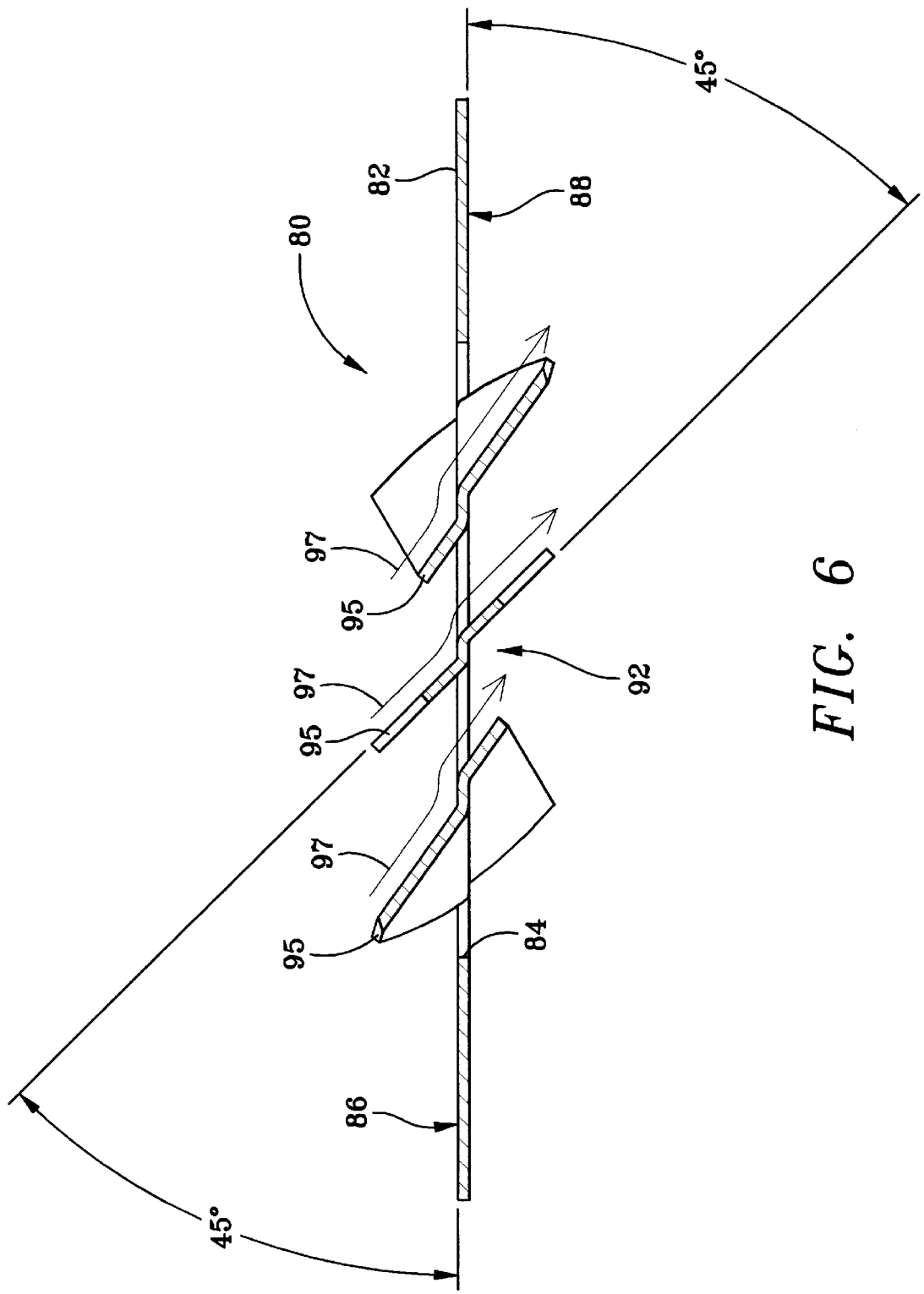
FIG. 6 is a sectional view of the separator element of FIG. 4 taken along line 6—6 in FIG. 4.

As shown in FIG. 3, when the separator element outer ring 82 is seated on flange 74, the second guide vanes 96 are located in inlet 76, and the first guide vanes 95 are located in inlet piping 75. As shown in FIG. 6, the first and second guide vanes are oriented at angles of forty-five degrees relative to the outer ring so that each flow directing element has a step-like configuration comprised of an angled first guide vane 95, a horizontal rib 94, and an angled second guides vane 96. The flow directing elements are spaced around the hub, in succession. As shown in FIG. 4, for purposes of describing the preferred embodiment of the invention, the separator element includes eight flow directing elements 92.

Figure 7:
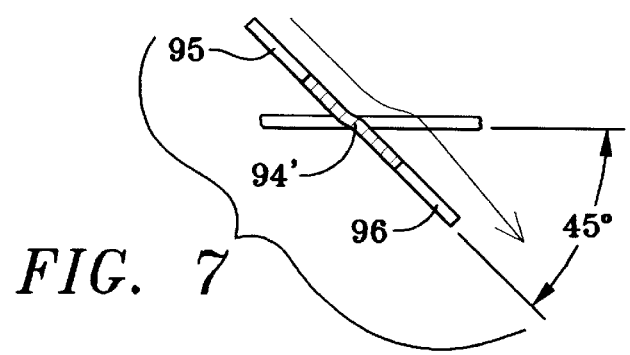
FIG. 7 is a sectional view of a flow directing element of FIG. 6, showing an alternate orientation of the rib of the flow directing element.
Figure 5:
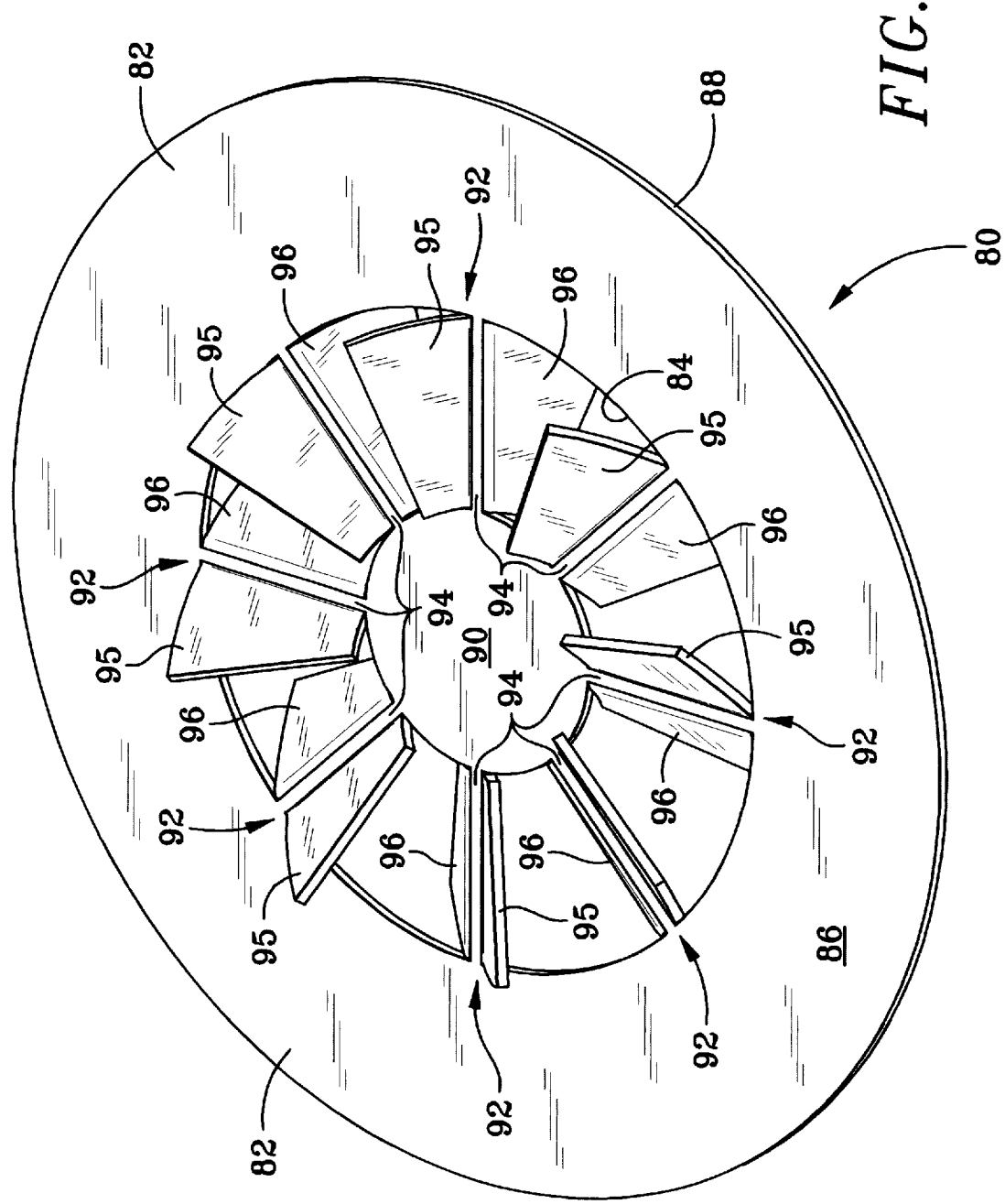
FIG. 5 is an isometric view of the separator element of FIG. 4.

Although the rib 94 is shown in FIG. 6 to be coplanar with hub 94 and outer ring 82, it should be understood that the rib may also be oriented at an angle relative to the outer ring as shown in FIG. 7. It is contemplated that the angle may be 45 degrees relative to the outer ring. The contemplated angled rib is identified as 94' in FIG. 7.

Primary separation of the mixture comprised of compressed gas and fluid is achieved by the vortex which is produced by the flow directing elements 92 of separator element 80.

Substantially liquid-free compressed gas is flowed from the chamber 62 through an L-shaped discharge elbow 100. The elbow is also a means of achieving secondary separation of the liquid from the compressed gas within chamber 62. The elbow includes an inlet 102 having a diameter D, and a discharge end 104 with a flange member 106 that is held stationary between the discharge flange 78 and discharge piping flange 79 when the discharge piping is fastened to the flange 78 by conventional connection members 77. The inlet portion of the elbow is oriented substantially vertically, parallel to the tank sidewall, and the discharge portion of the elbow is substantially perpendicular to the sidewall. As a result of experiments conducted by the inventors, it has been determined that moisture separator operates most efficiently and most effectively when the elbow inlet 102 is located in chamber 62 and is separated from inlet 76 by a distance equal to 1.25 times the inlet diameter D.

Operation of the moisture separator 40 will now be described. As the mixture comprised of liquid and compressed gas is flowed through piping 75 and encounters the flow directing elements 92, the mixture is directed between adjacent elements, around first guide vanes 95, ribs 94 and second guide vanes 96 in the downstream direction indicated by arrow 97, and continues through inlet 76 in a counter-clockwise swirling direction.

As the mixture passes through the spaces between elements 92, the velocity of the mixture increases and a vortex, V, shown in dashed font in FIG. 3, is established in separator tank inlet 76 and continues into the tank separation chamber 62. Resultant centrifugal forces produced by the vortex force condensed liquid to the outer periphery of the vortex. As the mixture flows towards discharge port 44, the velocity of the mixture decreases causing the liquid along the outer periphery to fall downward and collect in sump 64.

Although the velocity of the mixture is decreasing as it moves towards discharge port 44, the mixture remains in a vortex and the remaining condensed liquid is forced away from the center of the chamber and inlet 102. The moist compressed gas along the outer periphery of the vortex travels past inlet 102 and the drier centrally located compressed gas flows out of the chamber through inlet 102.

The vortex is broken as it encounters and impinges the radially extending discharge portion of discharge elbow 100. The impingement of the mixture and elbow causes the condensed liquid to fall to the sump 64. The remaining compressed gas rises upward out of the chamber through inlet 102. In this way, primary separation is achieved by the vortex V generated by the separator element 80 and secondary separation is achieved by impingement with elbow 100.

While a particular embodiment of this invention has been shown and described, it is not intended to limit the same to the details of construction set forth, but instead, the invention embraces such changes, modifications and equivalents of the various parts and their relationships as come within the purview of the following claims.

Having described the invention what is claimed is:

1. A moisture separator comprising:
   A) a separator tank that defines a separation chamber, the separator tank having an inlet, and a discharge port, the separation chamber further defining a sump;
   B) a separation element located at the separator tank inlet, proximate the separation chamber, the separation element comprising an outer ring having a first side and a second side, the outer ring defining a flow opening; a hub located in the flow opening; and a plurality of flow directing elements, each flow directing element comprising a rib joining the outer ring and the hub, a first guide vane made integral with the rib and located along the first side of the outer ring, and a second guide vane made integral with the rib and located along the second side of the outer ring, the moisture separator further comprising a discharge flow tube having a discharge end located in the separator tank discharge port and an inlet end located in the separation chamber, wherein the discharge flow tube is L-shaped, the inlet end of the discharge flow tube has a diameter, and the inlet end of the discharge flow tube is separated from the tank inlet by a distance equal to the product of 1.25 and the diameter of the inlet end.

2. The moisture separator as claimed in claim 1 wherein each of the flow directing element ribs is located in the flow opening.

3. The moisture separator as claimed in claim 1 wherein the first and second guide vanes are oriented at an angle of 45 degrees relative to the outer ring.

4. The moisture separator as claimed in claim 1 wherein there are eight flow directing elements.

5. A moisture separator comprising:
   A) a separator tank that defines a separation chamber, the separator tank having an inlet, and an inlet flange having a thickness;
   B) a separation element located at the separator tank inlet, proximate the separation chamber, the separation element comprising an outer ring having a first side and a second side, the outer ring defining a flow opening having a diameter, the thickness of the inlet flange being equal to the flow opening diameter; a hub located in the flow opening; and a plurality of flow directing elements, each flow directing element comprising a rib joining the outer ring and the hub, a first guide vane made integral with the rib and located along the first side of the outer ring, and a second guide vane made integral with the rib and located along the second side of the outer ring in the separation chamber inlet.

6. The moisture separator as claimed in claim 5 wherein the separator element is located on the inlet flange.

7. A moisture separator comprising:
   A) a separator tank that defines a separation chamber, the separator tank having an inlet;
   B) a separation element located at the separator tank inlet, proximate the separation chamber, the separation element comprising an outer ring having a first side and a second side, the outer ring defining a flow opening; a hub located in the flow opening; and a plurality of flow directing elements, each flow directing element comprising a rib joining the outer ring and the hub, a first guide vane made integral with the rib and located along the first side of the outer ring, and a second guide vane made integral with the rib and located along the second side of the outer ring, the first guide vane, rib, and second guide vane of each flow directing element arranged in a step-like configuration.

8. The moisture separator as claimed in claim 7 wherein the first and second guide vanes of each flow directing element are oriented at an angle relative to the outer ring.

9. The moisture separator as claimed in claim 8 wherein the guide vanes are oriented at an angle of forty-five degrees relative to the outer ring.

10. The moisture separator as claimed in claim 7 wherein the moisture separator has eight flow directing elements spaced around the hub.

11. The moisture separator as claimed in claim 7, the moisture separator further comprising a discharge flow tube having an inlet end located in the separation chamber, the inlet end of the discharge flow tube having a diameter and the inlet end of the discharge flow tube being separated from the tank inlet by a distance at least equal to the product of 1.25 and the diameter of the inlet end.

12. The moisture separator as claimed in claim 7 wherein the separator tank includes an inlet flange with a thickness, the flow opening of the inlet flange has a diameter and the thickness f the inlet flange is equal to the flow opening diameter.

* * * * *